United States Patent
Sim et al.

(10) Patent No.: US 9,532,064 B2
(45) Date of Patent: Dec. 27, 2016

(54) SCALABLE VIDEO CODING METHOD AND APPARATUS USING INTRA PREDICTION MODE

(71) Applicant: INTELLECTUAL DISCOVERY CO., LTD., Seoul (KR)

(72) Inventors: Dong Gyu Sim, Seoul (KR); Jung Hak Nam, Seoul (KR); Hyun Ho Jo, Seoul (KR); Hyo Min Choi, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/852,966

(22) Filed: Sep. 14, 2015

(65) Prior Publication Data

US 2016/0037173 A1    Feb. 4, 2016

Related U.S. Application Data

(62) Division of application No. 13/659,000, filed on Oct. 24, 2012, now abandoned.

(60) Provisional application No. 61/551,442, filed on Oct. 26, 2011.

(30) Foreign Application Priority Data

Dec. 8, 2011   (KR) .................. 10-2011-0131155

(51) Int. Cl.
| | |
|---|---|
| H04N 19/172 | (2014.01) |
| H04N 19/30 | (2014.01) |
| H04N 19/11 | (2014.01) |
| H04N 19/117 | (2014.01) |
| H04N 19/176 | (2014.01) |
| H04N 19/44 | (2014.01) |

(52) U.S. Cl.
CPC ............ *H04N 19/172* (2014.11); *H04N 19/11* (2014.11); *H04N 19/117* (2014.11); *H04N 19/176* (2014.11); *H04N 19/30* (2014.11); *H04N 19/44* (2014.11)

(58) Field of Classification Search
CPC .................................................. H04N 19/172
USPC ...................................................... 375/240.12
See application file for complete search history.

(56) References Cited

U.S. PATENT DOCUMENTS

| | | | | |
|---|---|---|---|---|
| 8,228,984 | B2* | 7/2012 | Jeon ...................... | H04N 19/176 375/240.12 |
| 8,908,758 | B2* | 12/2014 | Leontaris ............. | H04N 19/597 375/240.01 |
| 9,270,871 | B2* | 2/2016 | Pahalawatta ............ | H04N 5/21 |

(Continued)

OTHER PUBLICATIONS

14852966_Mar. 19, 2016_Joint Scalable Video Model JSVM-3; Julien Reichel 2005.*

*Primary Examiner* — William C Vaughn, Jr.
*Assistant Examiner* — Luis Perez Fuentes
(74) *Attorney, Agent, or Firm* — NSIP Law

(57) ABSTRACT

The present invention relates to a scalable video coding method and apparatus using an intra prediction mode. A decoding method includes configuring a maximum probability mode set for predicting an intra prediction mode for a target decoding block of an enhancement layer so that the maximum probability mode set includes an intra prediction mode for a corresponding block of a reference layer and restoring the target decoding block of the enhancement layer using any one of intra prediction modes included in the maximum probability mode set.

4 Claims, 14 Drawing Sheets

(56) References Cited

U.S. PATENT DOCUMENTS

| | | | | |
|---|---|---|---|---|
| 2012/0063695 A1* | 3/2012 | Wu | ............... | H04N 19/61 |
| | | | | 382/238 |
| 2013/0222539 A1* | 8/2013 | Pahalawatta | ....... | H04N 13/0048 |
| | | | | 348/43 |
| 2014/0192865 A1* | 7/2014 | Zhang | .............. | H04N 19/00575 |
| | | | | 375/240.12 |

* cited by examiner

FIG. 8

| BLOCK SIZE | NUMBER OF INTRA PREDICTION MODES |
|---|---|
| 4X4 | 18 |
| 8X8 | 35 |
| 16X16 | 35 |
| 32X32 | 35 |
| 64X64 | 4 |

FIG. 13
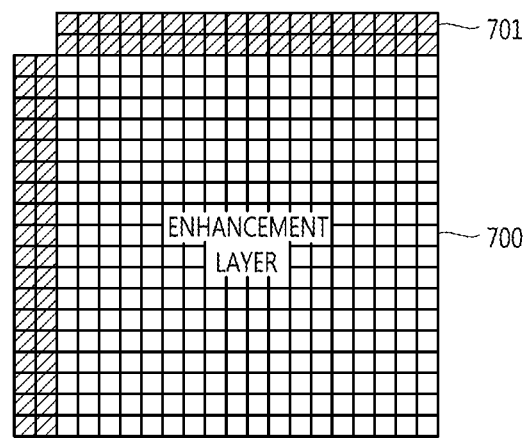
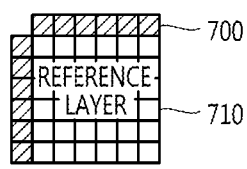

FIG. 14

| BLOCK SIZE | NUMBER OF INTRA PREDICTION MODES | NUMBER OF INTRA PREDICTION MODES (ENHANCEMENT LAYER) |
|---|---|---|
| 4X4 | 18 | 18+INTRA PREDICTION MODE FOR CORRESPONDING BLOCK OF REFERENCE LAYER |
| 8X8 | 35 | 35 |
| 16X16 | 35 | 35 |
| 32X32 | 35 | 35 |
| 64X64 | 4 | 4+INTRA PREDICTION MODE FOR CORRESPONDING BLOCK OF REFERENCE LAYER |

SCALABLE VIDEO CODING METHOD AND APPARATUS USING INTRA PREDICTION MODE

CROSS REFERENCE TO RELATED APPLICATIONS

This application is a divisional of U.S. patent application Ser. No. 13/659,000 filed Oct. 24, 2012, claiming the benefit of U.S. provisional application No. 61/551,442 filed on Oct. 26, 2011 and Korean patent application number 10-2011-0131155 filed on Dec. 8, 2011. These applications are incorporated herein by reference.

BACKGROUND OF THE INVENTION

Field of the Invention

The present invention relates to video processing technology and, more particularly, to a scalable video coding method and apparatus for coding/decoding a video.

Discussion of the Related Art

As broadcasting service having High Definition (1280×720 or 1920×1080) is extended domestically and globally, lots of users are becoming accustomed to pictures of high resolution and high picture quality and thus lots of organizations put spurs to the development of the next-generation image devices. Furthermore, as interest in Ultra High Definition (UHD) having resolution 4 times higher than the HDTV, together with HDTV, is increasing, moving picture standardization organizations have recognized a necessity for compression technology for a picture of higher resolution and high picture quality. Furthermore, there is a need for a new standard which can provide the same picture quality as that of the existing coding methods and also provide lots of advantages in terms of a frequency band and storage through compression efficiency higher than that of H.264/Advanced Video Coding (AVC), that is, a moving picture compression coding standard that is now used in HDTV and mobile phones. Moving Picture Experts Group (MPEG) and Video Coding Experts Group (VCEG) jointly perform a standardization task for High Efficiency Video Coding (HEVC), that is, the next-generation video codec. An outline object of HEVC is to code a video, including a UHD picture, in compression efficiency that is twice that of H.264/AVC. HEVC can provide not only HD and UHD pictures, but also a picture of high picture quality in a frequency lower than a current frequency even in 3D broadcasting and mobile communication networks.

In HEVC, a prediction picture can be generated by performing prediction on a picture spatially or temporally, and a difference between an original picture and the prediction picture can be coded. Video coding efficiency can be improved by this prediction coding.

SUMMARY OF THE INVENTION

An object of the present invention is to provide a scalable video coding method and apparatus capable of improving coding/decoding efficiency.

A scalable video decoding method in accordance with an embodiment of the present invention includes configuring a maximum probability mode set for predicting an intra prediction mode for a target decoding block of an enhancement layer so that the maximum probability mode set includes an intra prediction mode for a corresponding block of a reference layer and restoring the target decoding block of the enhancement layer using any one of intra prediction modes included in the maximum probability mode set.

A scalable video decoding apparatus in accordance with an embodiment of the present invention includes a mode set configuration unit configured to configure a maximum probability mode set for predicting an intra prediction mode for a target decoding block of an enhancement layer so that the maximum probability mode set includes an intra prediction mode for a corresponding block of a reference layer and a mode selection unit configured to reconstruct the target decoding block of the enhancement layer using any one of intra prediction modes included in the maximum probability mode set.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 8 is a table showing an embodiment of the number of selectable intra prediction modes depending on a block size;

FIG. 13 is a diagram illustrating a second embodiment of the inter-layer intra prediction method; and FIG. 14 is a table showing an embodiment of additionally selectable intra prediction modes in an enhancement layer depending on the block sizes of an enhancement layer and a reference layer.

DETAILED DESCRIPTION OF THE EMBODIMENTS

Hereinafter, exemplary embodiments are described in detail with reference to the accompanying drawings. In describing the embodiments of the present invention, a detailed description of the known functions and configurations will be omitted if it is deemed to make the gist of the present invention unnecessarily vague.

When it is said that one element is "connected" or "coupled" to the other element, the one element may be directly connected or coupled to the other element, but it should be understood that a third element may exist between the two elements. Furthermore, in the present invention, the contents describing that a specific element is "included (or comprised)" does not mean that elements other than the specific element are excluded, but means that additional elements may be included in the implementation of the present invention or in the scope of technical spirit of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may also be named a first element.

Furthermore, elements described in the embodiments of the present invention are independently shown in order to indicate different and characteristic functions, and it does not mean that each of the elements consists of separate hardware or a piece of software unit. That is, the elements are arranged, for convenience of description, and at least two of the elements may be combined to form one element or one element may be divided into a plurality of elements and the plurality of elements may perform functions. An embodiment in which the elements are combined or each of the elements is divided is included in the scope of the present invention without departing from the essence of the present invention.

Furthermore, in the present invention, some elements may not be essential elements for performing essential functions, but may be optional elements for improving only performance. The present invention may be embodied using only the essential elements for implementing the essence of the present invention other than the elements used to improve only performance, and a structure including only the essential elements other than the optional elements used to improve only performance are included in the scope of the present invention.

Figure 1:
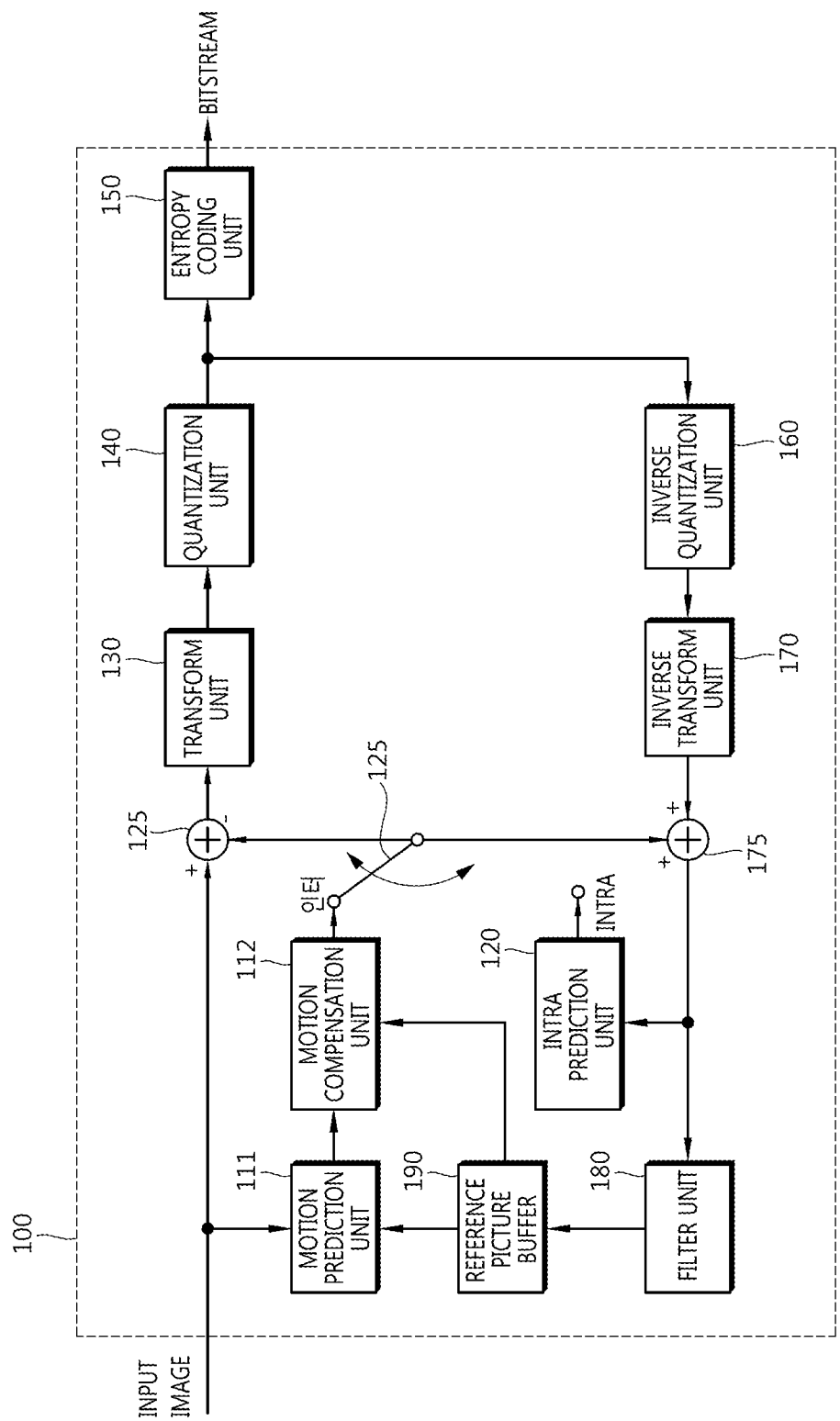
FIG. 1 is a block diagram showing a configuration according to an embodiment of a video coding apparatus to which the present invention is applied.

FIG. 1 is a block diagram showing a configuration according to an embodiment of a video coding apparatus to which the present invention is applied.

Referring to FIG. 1, the video coding apparatus 100 includes a motion prediction unit 111, a motion compensation unit 112, an intra prediction unit 120, a switch 115, a subtractor 125, a transform unit 130, a quantization unit 140, an entropy coding unit 150, an inverse quantization unit 160, an inverse transform unit 170, an adder 175, a filter unit 180, and a reference picture buffer 190.

The video coding apparatus 100 performs coding on an input picture in intra mode or inter mode and outputs a bitstream. Intra prediction means intra-picture prediction, and inter prediction means inter-picture prediction. In the case of the intra mode, the switch 115 is switched to the intro mode, and in the case of the inter mode, the switch 115 is switched to the inter mode. The video coding apparatus 100 generates a prediction block for the input block of the input picture and codes a difference between the input block and the prediction block.

In the case of the intra mode, the intra prediction unit 120 generates the prediction block by performing spatial prediction using the pixel values of coded neighboring blocks that are neighboring to a current block.

For the inter mode, in a motion prediction process, the motion prediction unit 111 searches a reference picture, stored in the reference picture buffer 190, for a region that is most well matched with an input block and calculates a motion vector. The motion compensation unit 112 generates a prediction block by performing motion compensation using the motion vector.

The subtractor 125 generates a residual block based on a difference between the input block and the generated prediction block. The transform unit 130 transforms the residual block and outputs a transform coefficient. Furthermore, the quantization unit 140 quantizes the input transform coefficients based on quantization parameters and outputs quantized coefficients according to the quantized transform coefficients. The entropy coding unit 150 performs entropy coding on the input quantized coefficients based on a probability distribution and outputs a bitstream.

In HEVC, a current coded picture needs to be decoded and stored in order to be used as a reference picture because inter prediction coding, that is, inter-picture prediction coding, is performed. Accordingly, a quantized coefficients are dequantized by the inverse quantization (dequantization) unit 160 and inversely transformed by the inverse transform unit 170. Dequantized and inversely transformed coefficients are added to a prediction block by the adder 175, so that a reconstruction block is generated.

The reconstruction block is input to the filter unit 180. The filter unit 180 may apply at least one of a deblocking filter, a Sample Adaptive Offset (SAO), and an Adaptive Loop Filter (ALF) to a reconstruction block or a reconstructed picture. The filter unit 180 may also be called an adaptive in-loop filter. The deblocking filter can remove block distortion that occurs at the boundary between blocks. The SAO can add a proper offset value to a pixel value in order to compensate for a coding error. The ALF can perform filtering based on a value obtained by comparing a reconstructed picture with an original picture, and the filtering may be performed only when high efficiency is applied. The reconstruction block that is output from the filter unit 180 is stored in the reference picture buffer 190.

Figure 2:
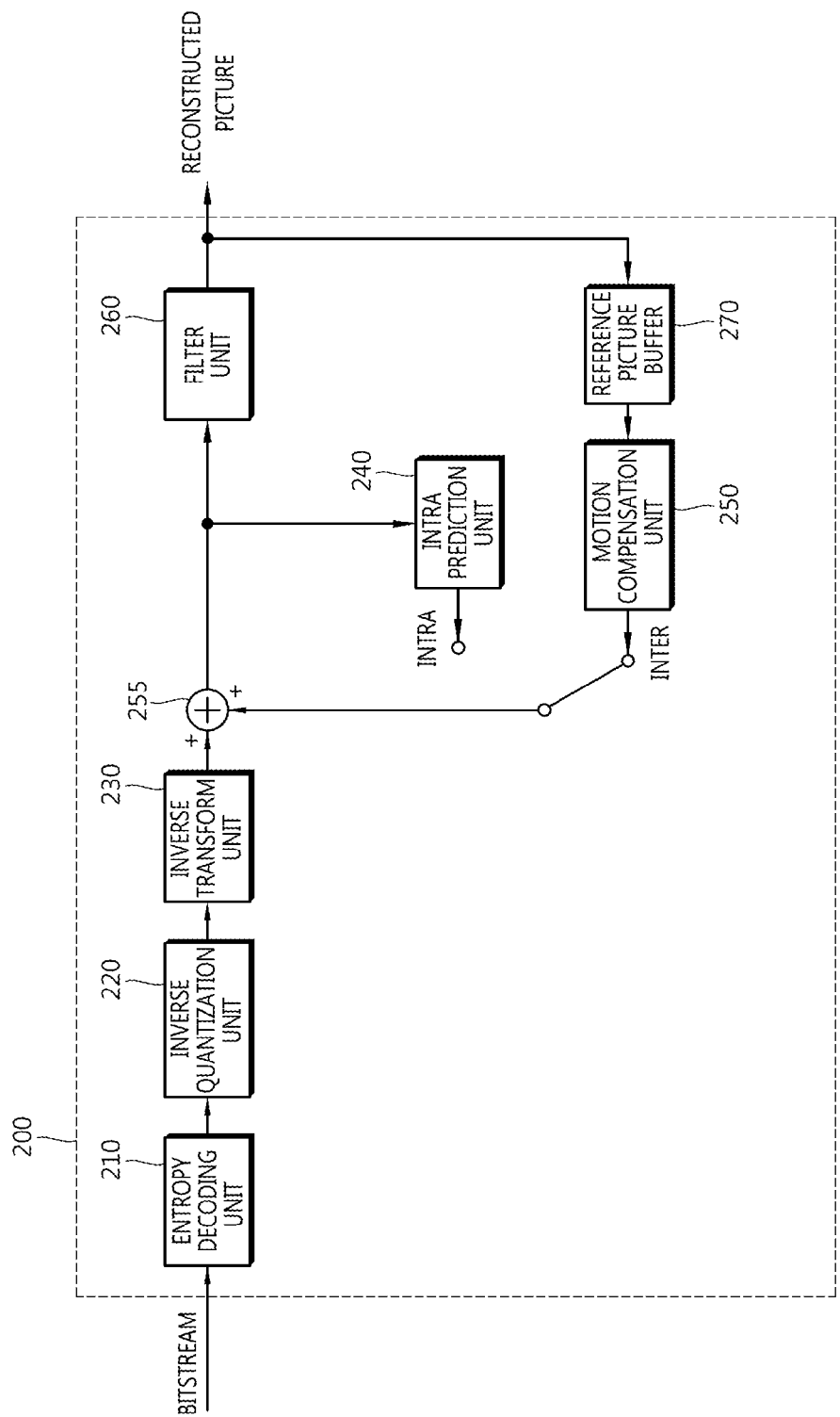
FIG. 2 is a block diagram showing a configuration according to an embodiment of a video decoding apparatus to which the present invention is applied.

FIG. 2 is a block diagram showing a configuration according to an embodiment of an video decoding apparatusto which the present invention is applied.

Referring to FIG. 2, the video decoding apparatus 200 includes an entropy decoding unit 210, an inverse quantization unit 220, an inverse transform unit 230, an intra prediction unit 240, a motion compensation unit 250, a filter unit 260, and a reference picture buffer 270.

The video decoding apparatus 200 receives a bitstream from a coder, decodes the bitstream in intra mode or inter mode, and outputs a reconfigured picture, that is, a reconstructed picture. A switch is switched to intra mode in the case of intra mode and to inter mode in the case of inter mode. The video decoding apparatus 200 obtains a residual block from an input bitstream, generates a prediction block, and generates a block configured by adding the residual block and the prediction block, that is, a reconstruction block.

The entropy decoding unit 210 performs entropy decoding on the input bitstream according to a probability distribution and outputs a quantized coefficient according to a result of the entropy decoding. The quantized coefficient is dequantized by the inverse quantization (dequantization)

unit 220 and then inversely transformed by the inverse transform unit 230, with the result that a residual block is generated.

In the case of intra mode, the intra prediction unit 240 generates a prediction block by performing spatial prediction using the pixel values of coded neighboring blocks.

In the case of inter mode, the motion compensation unit 250 generates a prediction block by performing motion compensation using a motion vector and a reference picture stored in the reference picture buffer 270.

The residual block and the prediction block are added by an adder 255. The added block is input to the filter unit 260. The filter unit 260 may apply at least one of a deblocking filter, an SAO, and an ALF to a reconstruction block or a reconstructed picture. The filter unit 260 outputs a reconfigured picture, that is, a reconstructed picture. The reconstructed picture can be stored in the reference picture buffer 270 and used in inter-picture prediction.

A method of improving the prediction performance of coding/decoding apparatuses includes a method of improving the accuracy of an interpolation picture and a method of predicting a difference signal. Here, the difference signal is a signal indicating a difference between an original picture and a prediction picture. In the present invention, a "difference signal" may be replaced with a "differential signal", a "residual block", or a "differential block" depending on context, and a person having ordinary skill in the art will distinguish them within a range that does not affect the spirit and essence of the invention.

Although the accuracy of an interpolation picture is improved, a difference signal is inevitably occurred. In order to improve coding performance, it is necessary to reduce a difference signal to be coded to a maximum extent by improving the prediction performance of the difference signal.

A filtering method using a fixed filter coefficient may be used as a method of predicting a difference signal. However, the prediction performance of this filtering method is limited because the filter coefficient cannot be adaptively used according to picture characteristics. Accordingly, it is necessary to improve the accuracy of prediction in such a manner that filtering is performed for each prediction block according to its characteristics.

Meanwhile, a target coding block is a set of pixels that are spatially coupled within a current target coding picture. The target coding block is a unit on which coding and decoding are performed, and it may have a quadrangle or a specific shape. A neighboring reconstruction block is a block on which coding and decoding have already been performed before a current target coding block is coded within a current target coding picture.

A prediction picture is a picture including a collection of prediction blocks used to code respective target coding blocks from the first target coding block to the current target coding block of an picture within a current target coding picture. Here, the prediction block refers to a block having a prediction signal used to code each target coding block within the current target coding picture. That is, the prediction block refers to each of blocks within a prediction picture.

A neighboring block refers to a neighboring reconstruction block of a current target coding block and a neighboring prediction block, that is, the prediction block of each neighboring reconstruction block. That is, a neighboring block refers to both a neighboring reconstruction block and a neighboring prediction block.

The prediction block of a current target coding block may be a prediction block that is generated by the motion compensation unit 112 or the intra prediction unit 120 according to the embodiment of FIG. 1. In this case, after a prediction block filtering process is performed on the prediction block generated by the motion compensation unit 112 or the intra prediction unit 120, the subtractor 125 may perform subtracting a filtered final prediction block from an original block.

A neighboring block may be a block stored in the reference picture buffer 190 according to the embodiment of FIG. 1 or a block stored in additional memory. Furthermore, a neighboring reconstruction block or a neighboring prediction block generated during a picture coding process may be used as a neighboring block.

Figure 3:
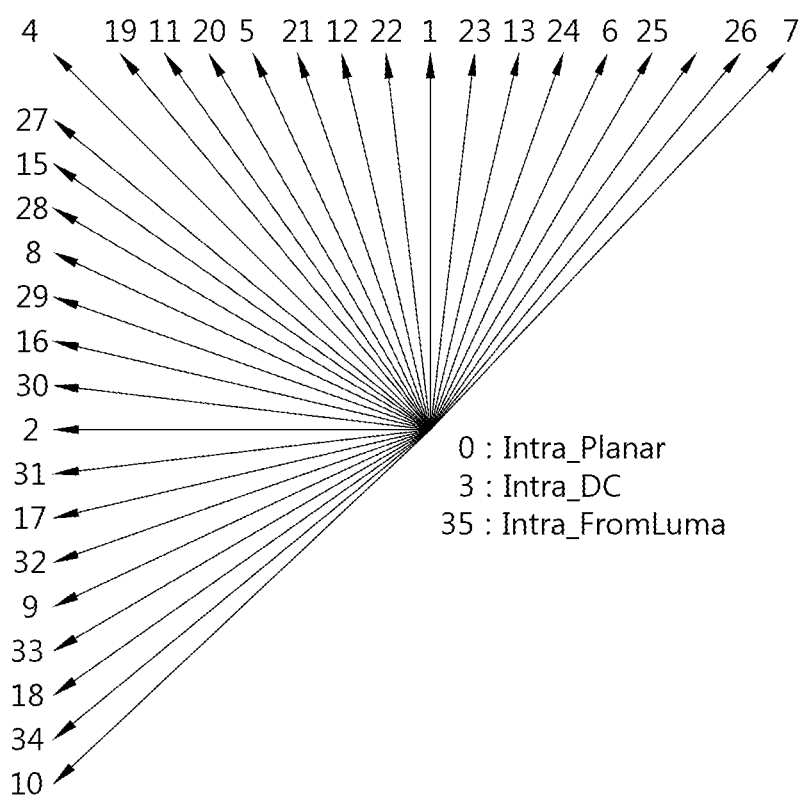
FIG. 3 is a conceptual diagram showing intra prediction modes used in an embodiment of the present invention.

FIG. 3 is a conceptual diagram showing intra prediction modes used in an embodiment of the present invention.

Referring to FIG. 3, there may be a different number of selectable intra prediction modes depending on the block size of a Coding Unit (CU).

That is, if a different number of intra prediction modes are used depending on the size of a CU, efficient intra prediction can be performed because an intra prediction direction can be determined depending on the size of a target coding (or decoding) block.

For example, in the case of H.264/AVC, there are 9 selectable intra prediction modes for a 4×4 luma block, and there are 4 selectable intra prediction modes for a 16×16 luma block and a chroma component.

Meanwhile, in the case of HEVC, there may be 18 selectable intra prediction modes for a 4×4 luma block, 35 selectable intra prediction modes for each of 8×8/16×16/32×32 luma blocks, and 4 selectable intra prediction modes for a 64×64 luma block.

The 35 selectable intra prediction modes may have respective directions and mode values, such as those shown in FIG. 3, and some of the 35 intra prediction modes shown in FIG. 3 may be selected for a 4×4 luma block and a 64×64 luma block.

The coding apparatus 100 can select a prediction mode that minimizes a difference between a prediction block and a target coding block from selectable intra prediction modes according to the block size of a CU and signal an intra prediction mode signal in order to inform the decoding apparatus 200 of the selected intra prediction mode.

Furthermore, since the intra prediction modes of the target coding block and its neighboring blocks may have association, the intra prediction modes of the target coding block can be predicted using the intra prediction modes of the neighboring blocks (e.g., a left block and an upper block) and a decoding apparatus can be informed of the predicted intra prediction modes.

Figure 4:
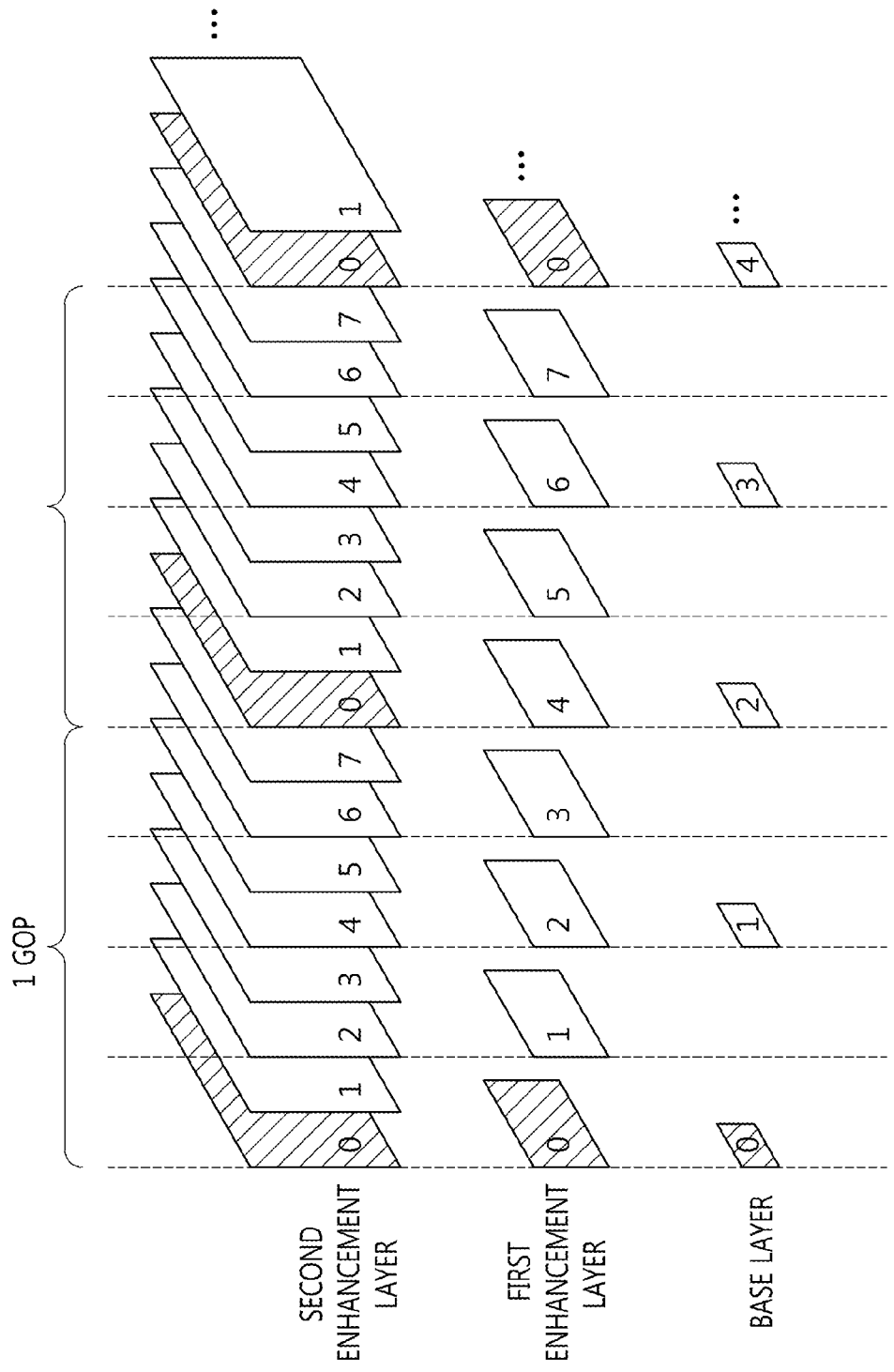
FIG. 4 is a conceptual diagram schematically showing an embodiment of a scalable video coding structure based on multiple layers.

FIG. 4 is a conceptual diagram schematically showing an embodiment of a scalable video coding structure using multiple layers to which the present invention can be applied. In FIG. 4, a Group Of Picture (GOP) indicates a picture group, that is, a group of pictures.

A transmission medium is necessary to transmit picture data, and a transmission medium has different performance depending on a variety of network environments. A scalable video coding method can be provided for the purpose of an application to a variety of transmission media or network environments.

The scalable video coding method is a coding method of improving coding/decoding performance by removing redundancy between layers reusing texture information, motion information, and a residual signal between the layers. The scalable video coding method can provide a variety of scalabilities from spatial, temporal, and picture quality points of view depending on surrounding conditions, such as a transfer bit rate, a transfer error rate, and system resources.

Scalable video coding can be performed using a multi-layer structure so that a bitstream applicable to a variety of network situations can be provided. For example, a scalable video coding structure may include a base layer for performing compression and processing on picture data using a common video coding method and an enhancement layer for performing compression and processing on picture data using both information on the coding of the base layer and a common video coding method.

Here, a layer means a set of pictures and bitstream which are distinguished from one another according to criteria, such as a space (e.g., a picture size), time (e.g., coding order and picture output order), picture quality, and complexity. Furthermore, multiple layers may have mutual dependency.

Referring to FIG. 4, for example, a base layer may be defined to have a Quarter Common Intermediate Format (QCIF), a frame rate of 15 Hz, and a bit rate of 3 Mbps. A first enhancement layer may be defined to have a Common Intermediate Format (CIF), a frame rate of 30 Hz, and a bit rate of 0.7 Mbps. A second enhancement layer may be defined to have Standard Definition (SD), a frame rate of 60 Hz, and a bit rate of 0.19 Mbps. The formats, the frame rates, and the bit rates are only illustrative and may be differently determined as occasion demands. Furthermore, the number of layers is not limited to that of the present embodiment, but may be differently determined according to situations.

Here, if a bitstream having a CIF and 0.5 Mbps is necessary, a bitstream may be segmented and transmitted in the first enhancement layer so that the bitstream has the bit rate of 0.5 Mbps. A scalable video coding method can provide temporal, spatial, and picture quality scalabilities through the method described in connection with the embodiment of FIG. 3.

Hereinafter, a target layer, a target picture, a target slice, a target unit, a target block, a target symbol, and a target bin mean a layer, a picture, a slice, a unit, a block, a symbol, and a bin, respectively, which are now being coded or decode. Accordingly, a target layer may be a layer to which a target symbol belongs, for example. Furthermore, other layers are layers except a target layer, and they are referred as available layers in a target layer. That is, other layers may be used to perform decoding in a target layer. Layers available in a target layer may include temporal, spatial, and picture quality lower layers, for example.

Furthermore, a corresponding layer, a corresponding picture, a corresponding slice, a corresponding unit, a corresponding block, a corresponding symbol, and a corresponding bin hereinafter mean a layer, a picture, a slice, a unit, a block, a symbol, and a bin, respectively, corresponding to a target layer, a target picture, a target slice, a target unit, a target block, a target symbol, and a target bin. A corresponding picture refers to a picture of another layer that is placed in the same time axis as that of a target picture. If a picture within a target layer has the same display order as a picture within another layer, it can be said that the picture within the target layer and the picture within another layer are placed in the same time axis. Whether pictures are placed in the same time axis or not can be checked using a coding parameter, such as a Picture Order Count (POC). A corresponding slice refers to a slice placed at a position that is spatially the same as or similar to that of the target slice of a target picture within a corresponding picture. A corresponding unit refers to a unit placed at a position that is spatially the same as or similar to that of the target unit of a target picture within a corresponding picture. A corresponding block refers to a block placed at a position that is spatially the same as or similar to that of the target block of a target picture within a corresponding picture.

Furthermore, a slice indicating a unit on which a picture is split is hereinafter used as a meaning that generally refers to a partition unit, such as a tile and an entropy slice. Independent picture coding and decoding are possible between partition units.

Furthermore, a block hereinafter means a unit of coding and decoding. When a picture is coded and decoded, a coding or decoding unit refers to a partition unit when splitting one picture into partition units and coding or decoding the partition units. Thus, the coding or decoding unit may also be called a macro block, a Coding Unit (CU), a Prediction Unit (PU), a Transform Unit (TU), or a transform block. One block may be further split into smaller lower blocks.

Inter-layer intra prediction, inter-layer inter prediction, or inter-layer differential signal prediction can be performed in order to remove redundancy between layers by taking the characteristics of scalable video coding, such as those described above, into consideration.

Inter-layer intra prediction is a method of enlarging a reconstructed pixel value of a reference layer according to the resolution of an enhancement layer and using the enlarged pixel value as a prediction signal, which is described in detail later.

A scalable video coding method in accordance with an embodiment of the present invention is hereinafter described with reference to FIGS. 5 to 10. Meanwhile, a method of coding an enhancement layer, such as that described with reference to FIG. 4, is described below.

Figure 5:
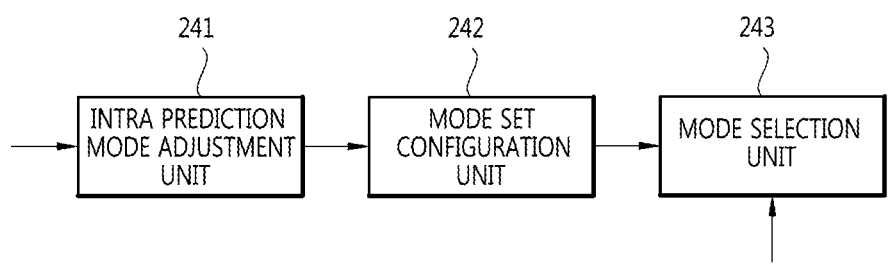
FIG. 5 is a block diagram showing a first embodiment of the configuration of an intra prediction unit shown in FIG. 2.

FIG. 5 is a schematic block diagram showing the configuration of one of the elements of the decoding apparatus in accordance with an embodiment of the present invention. FIG. 5 shows a detailed configuration of the intra prediction unit 240 shown in FIG. 2.

Referring to FIG. 5, an intra prediction mode adjustment unit 241 can adjust an intra prediction mode for a block of a reference layer that corresponds to a target decoding block of an enhancement layer.

A mode set configuration unit 242 can configure a maximum probability mode set in order to predict an intra prediction mode for the target decoding block of the enhancement layer.

The maximum probability mode set includes intra prediction modes that are very likely to be used for the target decoding block of the enhancement layer and may include 2 intra prediction modes having the highest possibility, for example.

In accordance with an embodiment of the present invention, when a block of a reference layer corresponding to the target decoding block of an enhancement layer has an intra prediction mode, the intra prediction mode adjustment unit 241 can adjust the intra prediction mode according to the number of intra prediction modes of the enhancement layer and a block size.

For example, if the number of intra prediction modes of a block of a reference layer that corresponds to the target decoding block of an enhancement layer is greater than the number of intra prediction modes of the target decoding block of the enhancement layer, the intra prediction mode of the block of the reference layer is adjusted so that it is smaller than the number of intra prediction modes of the target decoding block of the enhancement layer in order to be used as a prediction value for the intra prediction mode of the enhancement layer. If not, an intra prediction mode value for a corresponding block of the reference layer is not changed.

In accordance with an embodiment of the present invention, the mode set configuration unit 242 may be configured so that a maximum probability mode set for the target decoding block of the enhancement layer includes an intra prediction mode adjusted for a corresponding block of the reference layer.

For example, the reference layer may be a base layer.

Meanwhile, a mode selection unit 243 can select any one of intra prediction modes, belonging to the maximum probability mode set configured as described above, as a prediction value for an intra prediction mode for the target decoding block of an enhancement layer. That is, the intra prediction unit 240 configured to perform intra prediction on the enhancement layer fetches an intra prediction mode for a corresponding block of the reference layer so that an intra prediction mode for a target decoding block of the enhancement layer can be effectively predicted with reference to the fetched intra prediction mode.

The intra prediction unit 240, by using the intra prediction modes belonging to the maximum probability mode set, configured as described above, in response to an intra prediction mode bit signaled by the coding apparatus 100, can selects a final intra prediction mode to be applied to the target decoding block of the enhancement layer and generate a prediction signal through intra prediction.

This is because there is a strong possibility that an intra prediction mode for a target decoding block of an enhancement layer may be matched with an intra prediction mode for a corresponding block of a reference layer (e.g., a base layer) depending on association between blocks corresponding to the enhancement layer and the reference layer. As a result, coding/decoding efficiency can be improved.

Figure 6:
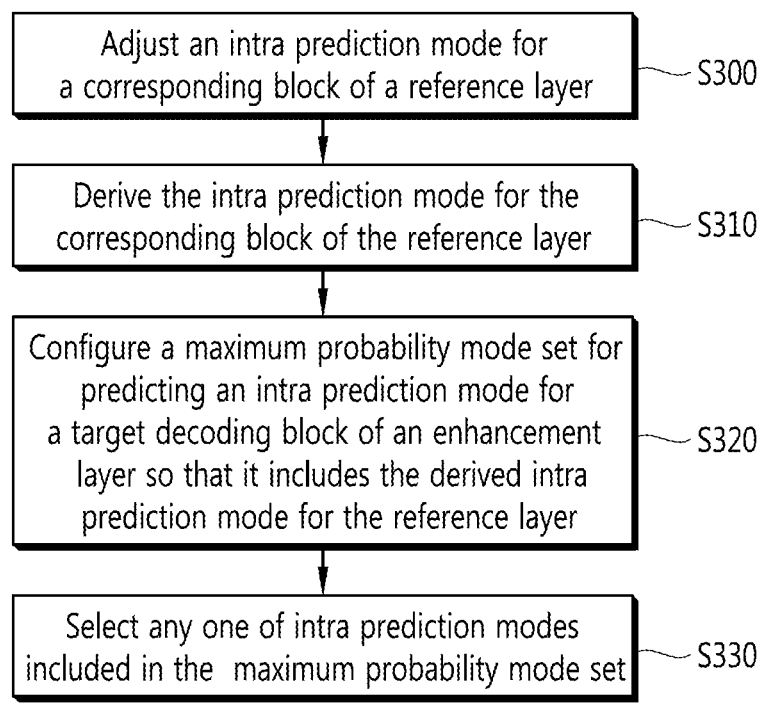
FIG. 6 is a flowchart illustrating a scalable video coding method in accordance with a first embodiment of the present invention.

FIG. 6 is a flowchart illustrating a scalable video coding method in accordance with a first embodiment of the present invention. The video coding method of FIG. 6 is described with reference to the block diagram showing the configuration of the intra prediction unit 240 of FIG. 5 in accordance with an embodiment of the present invention.

Referring to FIG. 6, the intra prediction mode adjustment unit 241 configured to adjust a mode for a reference layer in order to predict an intra prediction mode for the target decoding block of an enhancement layer adjusts an intra prediction mode for a corresponding block of the reference layer based on context information on the enhancement layer at step S300.

The mode set configuration unit 242 derives the adjusted intra prediction mode for the corresponding block of the reference layer at step S310.

The mode set configuration unit 242 configures a maximum probability mode set for predicting an intra prediction mode for a target decoding block of the enhancement layer so that it includes the intra prediction mode for the corresponding block of the reference layer at step S320.

The mode selection unit 243 selects any one of intra prediction modes included in the configured maximum probability mode set, in response to an intra prediction mode signal signaled by the coding apparatus 100 at step S330.

The intra prediction unit 240 can generate the intra prediction mode of the enhancement layer using the intra prediction mode selected by the above-described steps and a flag relating to the intra prediction mode and reconstruct the target decoding block of the enhancement layer using the generated intra prediction mode.

Figure 7:
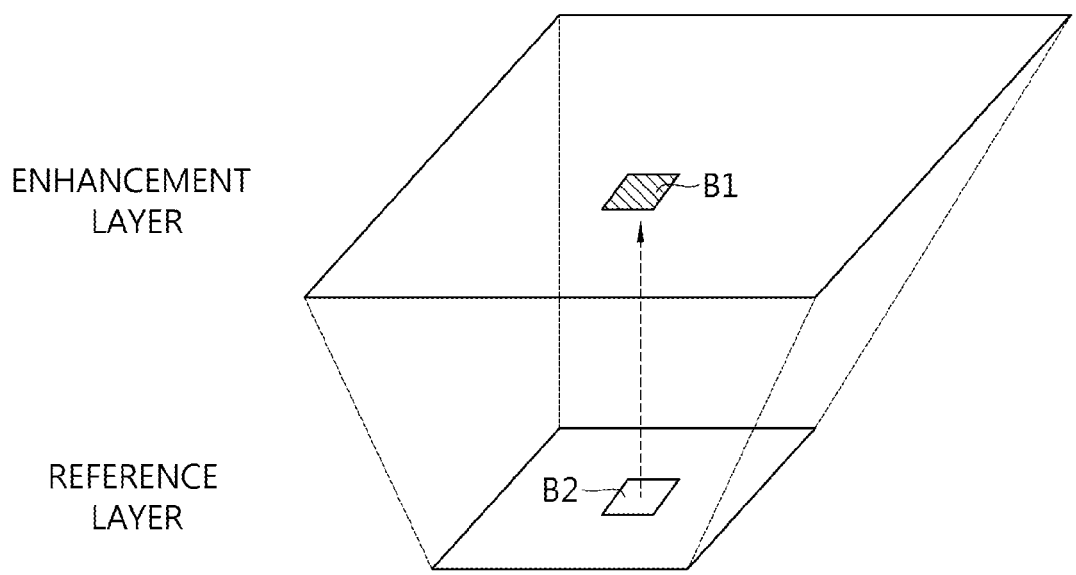
FIG. 7 is a diagram illustrating a first embodiment of an inter-layer intra prediction method.

Referring to FIG. 7, the mode set configuration unit 242 can reconfigure the maximum probability mode set so that it includes an adjusted intra prediction mode for a corresponding block B2 of a base layer in order to predict an intra prediction mode for a target decoding block B1 of an enhancement layer.

For example, the corresponding block B2 of the base layer may be a block that is most well matched with the target decoding block B1 of the enhancement layer among blocks placed in the base layer, or may be a co-located block that is placed at a position corresponding to that of the target decoding block B1 of the enhancement layer.

Referring to FIG. 8, when the target decoding block of the enhancement layer has a size of 64×64, if the intra mode of the reference layer has a value greater than 3 (=the number of intra prediction modes of the 64×64 block-1), the intra prediction mode adjustment unit 241 adjusts the corresponding intra mode in a range of 0~3.

For another example, when the target decoding block of the enhancement layer has a size of 4×4, if the intra mode of the reference layer has a value greater than 17 (=the number of intra prediction modes of the 4×4 block-1), the intra prediction mode adjustment unit 241 adjusts the corresponding intra mode in a range of 0~18.

An embodiment of a method of configuring the maximum probability mode at the step S310 is described in detail below with reference to FIG. 9.

Figure 9:
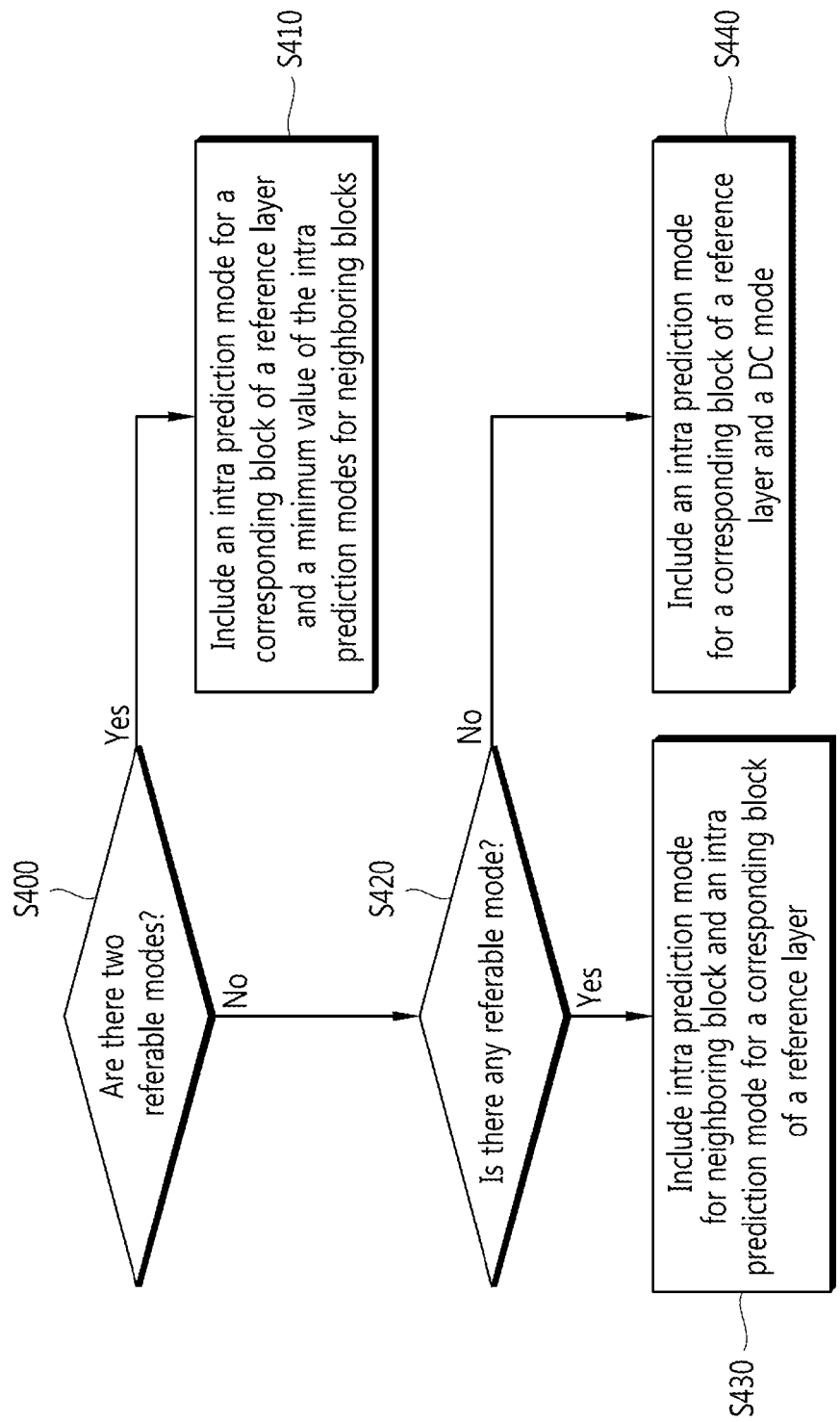
FIG. 9 is a flowchart illustrating a scalable video coding method in accordance with a second embodiment of the present invention.

Referring to FIG. 9, the mode set configuration unit 242 first determines whether there are two referable intra prediction modes in the neighboring blocks of the enhancement layer or not at step S400.

For example, if different intra prediction modes are used for the left block and upper block of a target decoding block of the enhancement layer, it may be determined that there are two referable intra prediction modes.

If any one of the left block and the upper block does not use intra prediction (e.g., inter prediction is used) or the same intra prediction mode is used for the left block and the upper block, however, it may be determined that there are no two referable intra prediction modes.

If it is determined that there are two referable intra prediction modes, the mode set configuration unit 242 configures a maximum probability mode set so that it includes a minimum value of an intra prediction mode for a corresponding block of a reference layer and the two referable intra prediction modes at step S410.

If however, it is determined that there are no two referable intra prediction modes, the mode set configuration unit 242 determines whether there is any one referable intra prediction mode in the neighboring blocks of the enhancement layer or not at step S420.

For example, if any one of the left block and the upper block uses intra prediction or the same intra prediction mode is used for the left block and the upper block, it may be determined that there is one referable intra prediction mode.

If both the left block and the upper block do not use intra prediction, however, it may be determined that there is no referable intra prediction mode.

If it is determined that there is one referable intra prediction mode, the mode set configuration unit 242 configures the maximum probability mode set so that it includes the intra prediction mode of the neighboring block and an intra prediction mode for the corresponding block of the reference layer at step S430.

If it is determined that there is no referable intra prediction mode, the mode set configuration unit 242 configures the maximum probability mode set so that the maximum probability mode set includes an intra prediction mode for the corresponding block of the reference layer and a DC mode at step S440.

In this case, the coding apparatus 100 can select one of the intra prediction modes, included in the maximum probability mode set configured as described above, as an intra prediction mode for the target decoding block of the enhancement layer and signal an intra prediction mode signal based on information on the selected intra prediction mode.

An embodiment of a method of configuring a maximum probability mode set when the intra prediction mode of a reference layer is not used is described in detail below with reference to FIG. 10.

Figure 10:
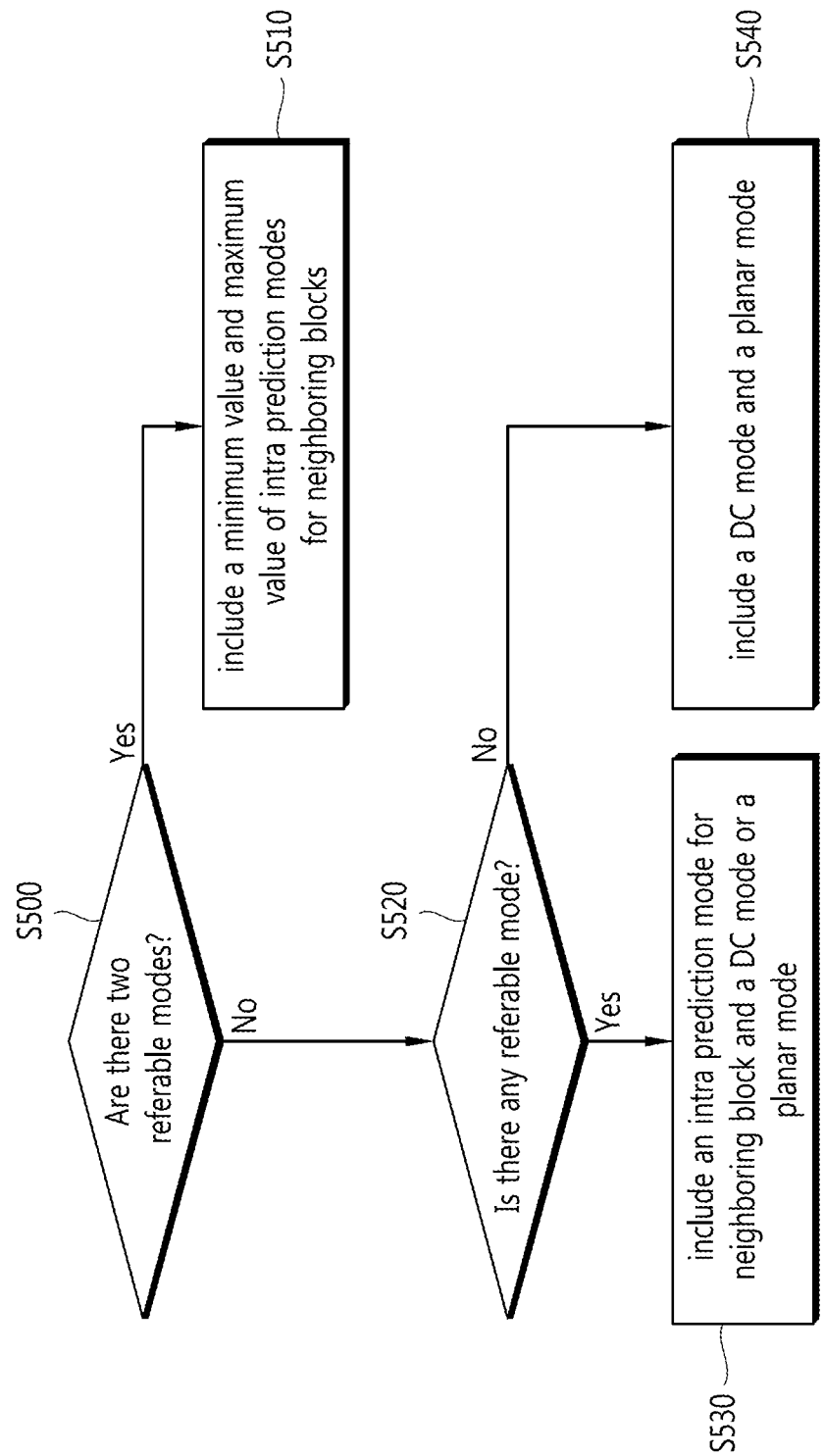
FIG. 10 is a flowchart illustrating a scalable video coding method in accordance with a third embodiment of the present invention.

Referring to FIG. 10, the mode set configuration unit 242 first determines whether there are two referable intra prediction modes in the neighboring blocks of the enhancement layer or not at step S500.

If it is determined that there are two referable intra prediction modes, the mode set configuration unit 242 configures the maximum probability mode set so that it includes a minimum value and maximum value of the two referable intra prediction modes at step S510.

If it is determined that there are no two referable intra prediction modes, however, the mode set configuration unit 242 determines whether there is any one referable intra prediction mode in the neighboring blocks of the enhancement layer at step S520.

If it is determined that there is one referable intra prediction mode, the mode set configuration unit 242 configures the maximum probability mode set so that it includes an intra prediction mode for the neighboring block and a DC mode or a planar mode at step S530.

If it is determined that there is no any referable intra prediction mode, the mode set configuration unit 242 configures the maximum probability mode set so that it includes a DC mode and a planar mode at step S540.

In accordance with yet another embodiment of the present invention, the intra prediction unit 240 configured to reconstruct a target decoding block of an enhancement layer can generate a prediction signal for an enhancement layer using pixel values reconstructed for a corresponding block of a reference layer.

For example, before enlarging the reconstructed pixel values of the reference layer corresponding to the target decoding block according to the resolution of the enhancement layer, the intra prediction unit 240 can improves corresponding reconstructed pixel values of the reference layer by filtering based on context between reconstructed neighboring pixel values of the reference layer and reconstructed neighboring pixel values of the enhancement layer. Next, texture obtained by enlarging the filtered pixel values of the reference layer according to the resolution can be used as a prediction signal for the target decoding block of the enhancement layer.

A scalable video coding method in accordance with another embodiment of the present invention is described in detail below with reference to FIGS. 11 to 13.

Figure 11:
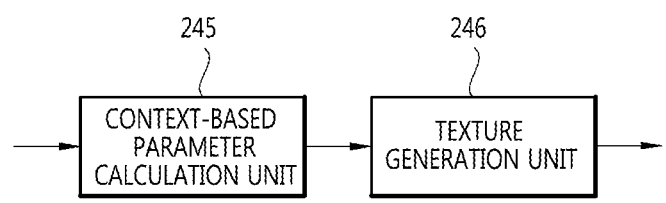
FIG. 11 is a block diagram showing a second embodiment of the configuration of the intra prediction unit shown in FIG. 2.

FIG. 11 is a block diagram showing a second embodiment of the configuration of the intra prediction unit 240 shown in FIG. 2. The intra prediction unit 240 of FIG. 11 may include a context-based parameter calculation unit 245 and a texture generation unit 246.

Referring to FIG. 11, the context-based parameter calculation unit 245 can calculate correlation parameters (e.g., $\alpha$ and $\beta$) between inter-layer reconstructed pixel values based on context information, such as reconstructed neighboring pixel values for the target decoding block of the enhancement layer and reconstructed neighboring pixel values for the corresponding block of the reference layer.

Meanwhile, the texture generation unit 246 can generate a prediction signal for the target decoding block of the enhancement layer by correcting reconstructed pixel values for the corresponding block of the reference layer using the calculated correlation parameters.

Figure 12:
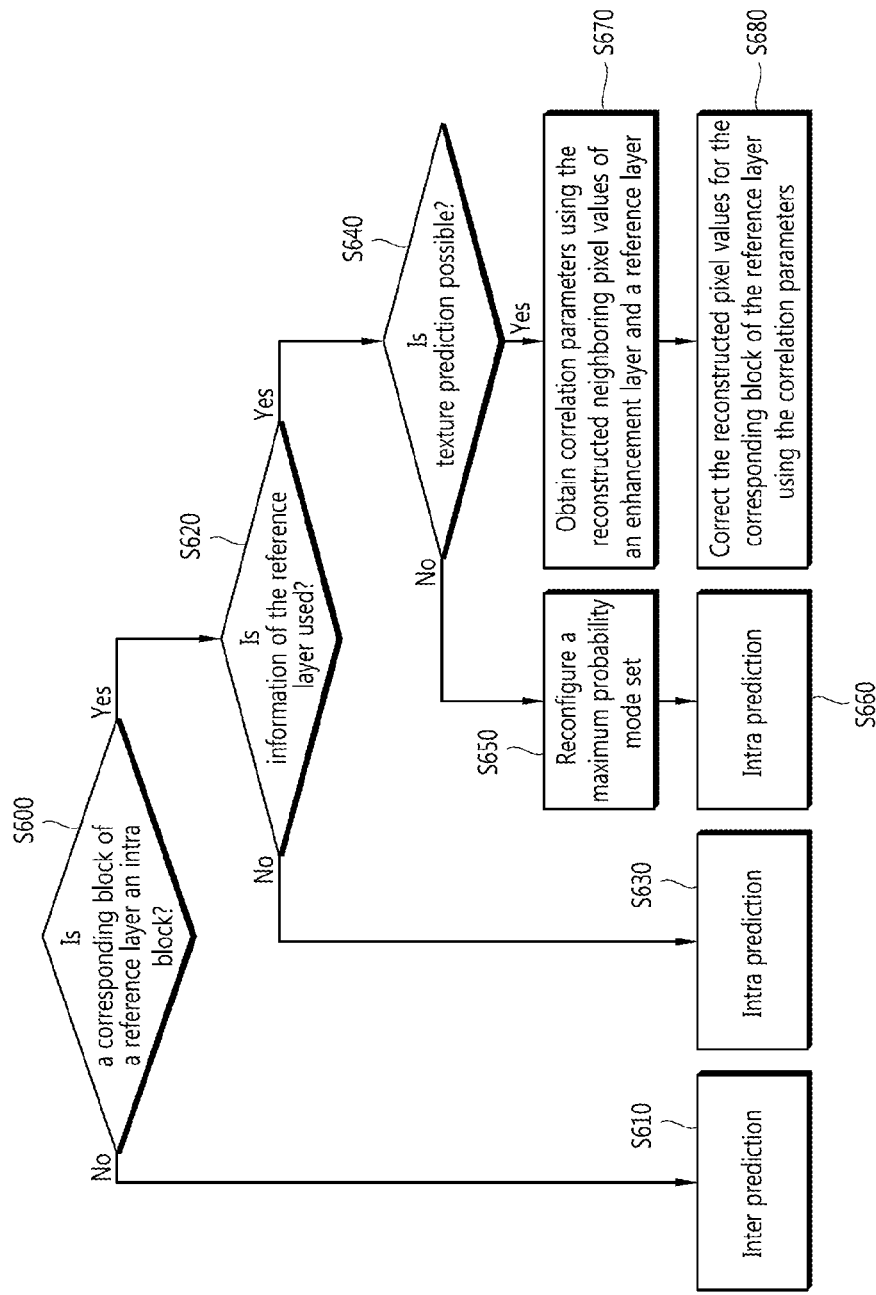
FIG. 12 is a flowchart illustrating a scalable video coding method in accordance with a fourth embodiment of the present invention.

FIG. 12 is a flowchart illustrating a scalable video coding method in accordance with yet another embodiment of the present invention. The scalable video coding method of FIG. 12 is described with reference to the block diagram showing the configuration of the intra prediction unit 240 of FIG. 11 in accordance with another embodiment of the present invention.

Referring to FIG. 12, the decoding apparatus 200 first determines whether a block of a reference layer corresponding to a target decoding block of an enhancement layer is an intra block or not at step S600.

If, as a result of the determination at step S600, it is determined that the corresponding block of the reference layer is not an intra block, the motion compensation unit 250 of the decoding apparatus 200 can perform inter prediction on the target decoding block of the enhancement layer at step S610.

If however, it is determined that the corresponding block of the reference layer is an intra block, the decoding apparatus 200 determines whether information of the reference layer will be used or not in order to perform intra prediction on the target decoding block of the enhancement layer at step S620.

If it is determined that information of the reference layer will not be used, the intra prediction unit 240 of the decoding apparatus 200 performs the intra prediction on the target decoding block of the enhancement layer using only information of the enhancement layer at step S630.

For example, at the step S630, the intra prediction unit 240 can generate a prediction block by performing spatial prediction using the pixel values of already coded blocks neighboring to a current target decoding block of the enhancement layer according to a specific intra prediction mode.

If, as a result of the determination at step S620, however, it is determined that information of the reference layer will be used, the intra prediction unit 240 determines whether texture prediction is possible or not at step S640.

For example, if a reference layer is an inter slice, a pixel value for a corresponding block of the reference layer is not reconstructed. In this case, a prediction signal for a target decoding block of an enhancement layer may not be generated using a reconstructed pixel value of the reference layer or texture may not be predicted using correlation parameters indicating context between reconstructed pixel values between layers.

If however, it is determined that texture prediction is not possible, the intra prediction unit 240 reconfigures a maximum probability mode set by adding an intra prediction mode for the corresponding block of the reference layer at step S650. Next, the intra prediction unit 240 selects one of intra prediction modes included in the reconfigured maximum probability mode set in response to an intra prediction mode signal signaled by the coding apparatus 100 and performs the intra prediction at step S660.

That is, one of methods, such as those described with reference to FIGS. 5 to 10, may be used as an intra prediction method when texture prediction is not possible.

If however, it is determined that texture prediction is possible, the context-based parameter calculation unit 245 of the intra prediction unit 240 calculates correlation parameters using the reconstructed neighboring pixel values of the enhancement layer and the reference layer at step S670.

The texture generation unit 246 corrects reconstructed pixel values for the corresponding block of the reference layer using the calculated correlation parameters at step S680.

Referring to FIG. 13, the context-based parameter calculation unit 245 can represent a correlation between inter-layer reconstructed pixel values in the form of parameters (e.g., α, β) based on context information, such as the reconstructed neighboring pixel values 711 of a reference layer and the reconstructed neighboring pixel values 701 of an enhancement layer.

The texture generation unit 246 can generate texture 700 which is suitable for the resolution of the enhancement layer and into which pixel context similarity between the layers has been incorporated by using the parameters outputted from the context-based parameter calculation unit 245 and reconstructed pixel values 710 for the corresponding block of the reference layer. The generated texture 700 is used as a prediction signal for the target decoding block of the enhancement layer.

For example, the texture generation unit 246 can generate the texture 700 used as the prediction signal for the target decoding block of the enhancement layer according to Equation 1 below.

$$Pred_c[x,y] = \alpha \cdot Rec_L'[x,y] + \beta$$

$$Rec_L'[x,y] = (Rec_L[2x,2y] + Rec_L[2x,2y+1]) >> 1 \quad \text{[Equation 1]}$$

In Equation 1, $Pred_c[x,y]$ is the texture 700 predicted by the texture generation unit 246, α and β are parameter values calculated by the context-based parameter calculation unit 245, $Rec_L[x,y]$ are the reconstructed pixel values 710 for the corresponding block of the reference layer, and $Rec_L'[x,y]$ are values obtained by scaling the reconstructed pixel values 710 for the corresponding block of the reference layer based on a difference between the resolutions of the enhancement layer and the reference layer.

In accordance with yet another embodiment of the present invention, the intra prediction unit 240 configured to reconstruct a target decoding block of an enhancement layer can reuse an intra prediction mode for a corresponding block of a reference layer in the enhancement layer.

For example, if a corresponding block of a reference layer corresponding to a target decoding block is an intra mode and a block which uses a more subdivided mode than an enhancement layer to be decoded, the intra prediction unit 240 additionally uses the intra mode of the corresponding block of the reference layer in a process of selecting the intra mode of the enhancement layer.

A scalable video coding method in accordance with yet another embodiment of the present invention is described in detail below with reference to FIG. 14.

FIG. 14 shows an operation according to a third embodiment of the configuration of the intra prediction unit 240 shown in FIG. 2.

Referring to FIG. 14, when the size of a target decoding block of an enhancement layer is 4×4 or 64×64 and the size of a target decoding block of a reference layer is any one of 8×8, 16×32, and 32×32, an intra prediction mode for a corresponding block of the reference layer is added to the predetermined selectable intra prediction modes, so that the number of selectable intra prediction modes for the target decoding block of the enhancement layer can be increased one by one.

To add an intra prediction mode for a corresponding block of a reference layer to predetermined selectable intra prediction modes as described above may be performed when the number of selectable intra prediction modes for a target decoding block of an enhancement layer is smaller than the number of selectable intra prediction modes for the corresponding block of the reference layer.

The scalable video coding methods and apparatuses in accordance with some embodiments of the present invention have been described above on the basis of a video decoding method and apparatus, but a scalable video coding method in accordance with an embodiment of the present invention may be embodied by performing a series of steps according to a decoding method, such as that described with reference to FIGS. 5, 13, and 14.

More particularly, in accordance with the scalable video coding methods and apparatuses according to the embodiments of the present invention, an intra prediction mode for a target coding block of an enhancement layer can be selected and a prediction signal can be generated according to the selected intra prediction mode by performing intra prediction having the same configuration as that of a decoding method and apparatus, such as those described with reference to FIGS. 5 to 13.

In accordance with an embodiment of the present invention, a maximum probability mode set for predicting the intra prediction mode of an enhancement layer is configured so that it includes an intra prediction mode for a corresponding block of a reference layer. Accordingly, coding efficiency can be improved because the number of bits necessary for coding and decoding is reduced, and thus more improved picture quality can be provided in the same bit rate.

Furthermore, in accordance with another embodiment of the present invention, the pixel values of a corresponding block of a reference layer are corrected using correlation parameters calculated based on reconstructed neighboring pixel values in an enhancement layer and the reference layer and then used as a prediction signal for a target decoding block of the enhancement layer. Accordingly, coding efficiency can be improved.

In the above exemplary systems, although the methods have been described on the basis of the flowcharts using a series of the steps or blocks, the present invention is not limited to the sequence of the steps, and some of the steps may be performed in order different from that of the remaining steps or may be performed simultaneously with the remaining steps. Furthermore, those skilled in the art will understand that the steps shown in the flowcharts are not exclusive and they may include other steps or one or more steps of the flowchart may be deleted without affecting the scope of the present invention.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

What is claimed is:

1. A method for decoding a scalable video signal based on an inter-layer texture prediction with a decoding apparatus, the method comprising:

determining whether the inter-layer texture prediction is performed on a current picture in an enhancement layer;

filtering, based on a resolution difference between the enhancement layer and a reference layer, a reconstructed reference picture in the reference layer to be used for the inter-layer texture prediction in response to the determining;

obtaining a predicted pixel value of a current block in the current picture by applying correlation parameters to a reconstructed pixel value of a reference block in the filtered reference picture, the correlation parameters including both
  a weighting value, determined by ALPHA parameter; and
  an offset value, determined by BETA parameter;

the correlation parameters being calculated in the decoding apparatus based on the reconstructed reference picture of the reference layer, the prediction pixel value of the current block being obtained by adding the offset value to a value resulting from multiplying the reconstructed pixel value of the reference block by the weighting value; and decoding the current block using the obtained predicted pixel value.

2. The method of claim 1, wherein the reference picture has a same picture output order as the current picture.

3. The method of claim 2, wherein the reference block is a co-located block of the current block within the filtered reference picture.

4. The method of claim 3, wherein the reference picture has a lower spatial resolution than the current picture.

* * * * *